(12) United States Patent
Condry et al.

(10) Patent No.: US 9,741,032 B2
(45) Date of Patent: Aug. 22, 2017

(54) SECURITY BROKER

(71) Applicant: McAfee, Inc., Santa Clara, CA (US)

(72) Inventors: Michael Condry, San Jose, CA (US);
Sven Schrecker, San Marcos, CA (US)

(73) Assignee: McAfee, Inc., Santa Clara, CA (US)

( * ) Notice: Subject to any disclaimer, the term of this patent is extended or adjusted under 35 U.S.C. 154(b) by 386 days.

(21) Appl. No.: 13/718,043

(22) Filed: Dec. 18, 2012

(65) Prior Publication Data

US 2014/0172706 A1 Jun. 19, 2014

(51) Int. Cl.
| | | |
|---|---|---|
| *G06Q 30/00* | (2012.01) | |
| *G06Q 20/38* | (2012.01) | |
| *G06Q 30/06* | (2012.01) | |
| *G06Q 20/40* | (2012.01) | |

(52) U.S. Cl.
CPC ....... *G06Q 20/382* (2013.01); *G06Q 20/4016* (2013.01); *G06Q 30/00* (2013.01); *G06Q 30/0601* (2013.01)

(58) Field of Classification Search
CPC .. G06Q 20/382; G06Q 20/4016; G06Q 30/00; G06Q 30/0601
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,460,050 B1 | 10/2002 | Pace et al. | |
| 7,185,366 B2 | 2/2007 | Mukai et al. | |
| 7,506,155 B1 | 3/2009 | Stewart et al. | |
| 7,844,530 B2 * | 11/2010 | Ziade et al. | 705/36 R |
| 8,478,708 B1 | 7/2013 | Larcom | |
| 8,621,637 B2 | 12/2013 | Al-Harbi et al. | |
| 8,726,379 B1 | 5/2014 | Stiansen et al. | |
| 9,323,935 B2 | 4/2016 | Condry et al. | |

(Continued)

FOREIGN PATENT DOCUMENTS

| | | |
|---|---|---|
| WO | WO 2014/099194 A1 | 6/2014 |
| WO | WO 2014/099195 A1 | 6/2014 |

OTHER PUBLICATIONS

U.S. Oct. 20, 2014 Final Rejection in U.S. Appl. No. 13/718,200, 23 pages.

(Continued)

*Primary Examiner* — Scott S Trotter
(74) *Attorney, Agent, or Firm* — Patent Capital Group

(57) ABSTRACT

An attempted transaction is identified involving a customer device and the first customer device is redirected to a security broker. A security report for the first customer device is received from the security broker. The security report is based on security data transmitted from the customer device to the security broker. An action can be performed in association with the attempted transaction based at least in part on the received security report. In some aspects, the security broker receives security data describing security conditions on the customer device in connection with the transaction between the customer device and a transaction partner. A risk tolerance policy is identified that corresponds to the transaction partner, such as an ecommerce provider. A security report is generated based on a comparison of the risk tolerance policy and the security data and the security report.

26 Claims, 7 Drawing Sheets

(56) References Cited

U.S. PATENT DOCUMENTS

| | | | |
|---|---|---|---|
| 2006/0282660 A1* | 12/2006 | Varghese et al. | ............ 713/155 |
| 2006/0282897 A1 | 12/2006 | Sima et al. | |
| 2007/0150932 A1 | 6/2007 | Milligan et al. | |
| 2009/0024663 A1 | 1/2009 | McGovern | |
| 2010/0095381 A1 | 4/2010 | Levi | |
| 2010/0125911 A1 | 5/2010 | Bhaskaran | |
| 2011/0067086 A1 | 3/2011 | Nachenberg et al. | |
| 2011/0154498 A1 | 6/2011 | Fissel et al. | |
| 2011/0167011 A1 | 7/2011 | Paltenghe et al. | |
| 2011/0213628 A1 | 9/2011 | Peak et al. | |
| 2012/0167162 A1 | 6/2012 | Raleigh et al. | |
| 2012/0174230 A1 | 7/2012 | Hoyt | |
| 2012/0185945 A1 | 7/2012 | Andres et al. | |
| 2012/0239928 A1 | 9/2012 | Judell | |
| 2012/0265690 A1 | 10/2012 | Bishop et al. | |
| 2013/0276124 A1 | 10/2013 | Tahir et al. | |
| 2014/0173738 A1 | 6/2014 | Condry et al. | |

OTHER PUBLICATIONS

U.S. Feb. 5, 2015 Nonfinal Rejection in U.S. Appl. No. 13/718,200, 24 pages.
International Search Report and Written Opinion in International Application No. PCT/US2013/070457, dated Mar. 4, 2014, 11 pages.
U.S. Jun. 24, 2014 Nonfinal Rejection in U.S. Appl. No. 13/718,200, 23 pages.
U.S. Jun. 18, 2015 Final Rejection in U.S. Appl. No. 13/718,200, 24 pages.
Preliminary Rejection in Korean Patent Application No. 2015-7012772, dated Feb. 26, 2016, English translation, 12 pages.
International Preliminary Report on Patentability in International Application No. PCT/US2013/070457, dated Jul. 2, 2015, 10 pages.
International Preliminary Report on Patentability in International Application No. PCT/US2013/070458, dated Jul. 2, 2015, 8 pages.
U.S. Dec. 11, 2015 Notice of Allowance in U.S. Appl. No. 13/718,200, 21 pages.
Notice of Final Rejection in Korean Patent Application No. 2015-7012772, dated Aug. 29, 2016, with English translation, 10 pages.
Supplementary European Search Report in EP Application No. 13 86 4946, dated Jun. 15, 2016, 9 pages.
International Search Report and Written Opinion in International Application No. PCT/US2013/070458, dated Mar. 13, 2014, 9 pages.
Notice of Final Rejection in Korean Patent Application No. 2015-7012772, dated Dec. 2, 2016, with English translation, 9 pages.
Communication in EP Application No. 13 86 4946, dated Mar. 13, 2017, 11 pages.
Network Working Group: "RFC 2616—Hypertext Transfer Protocol—HTTP/1.1", Jun. 30, 1999 (Jun. 30, 1999), XP055324113, Retrieved from the Internet: URL:https://tools.ietf.org/html/rfc2616 [retrieved on Nov. 29, 2016], 176 pages.

* cited by examiner

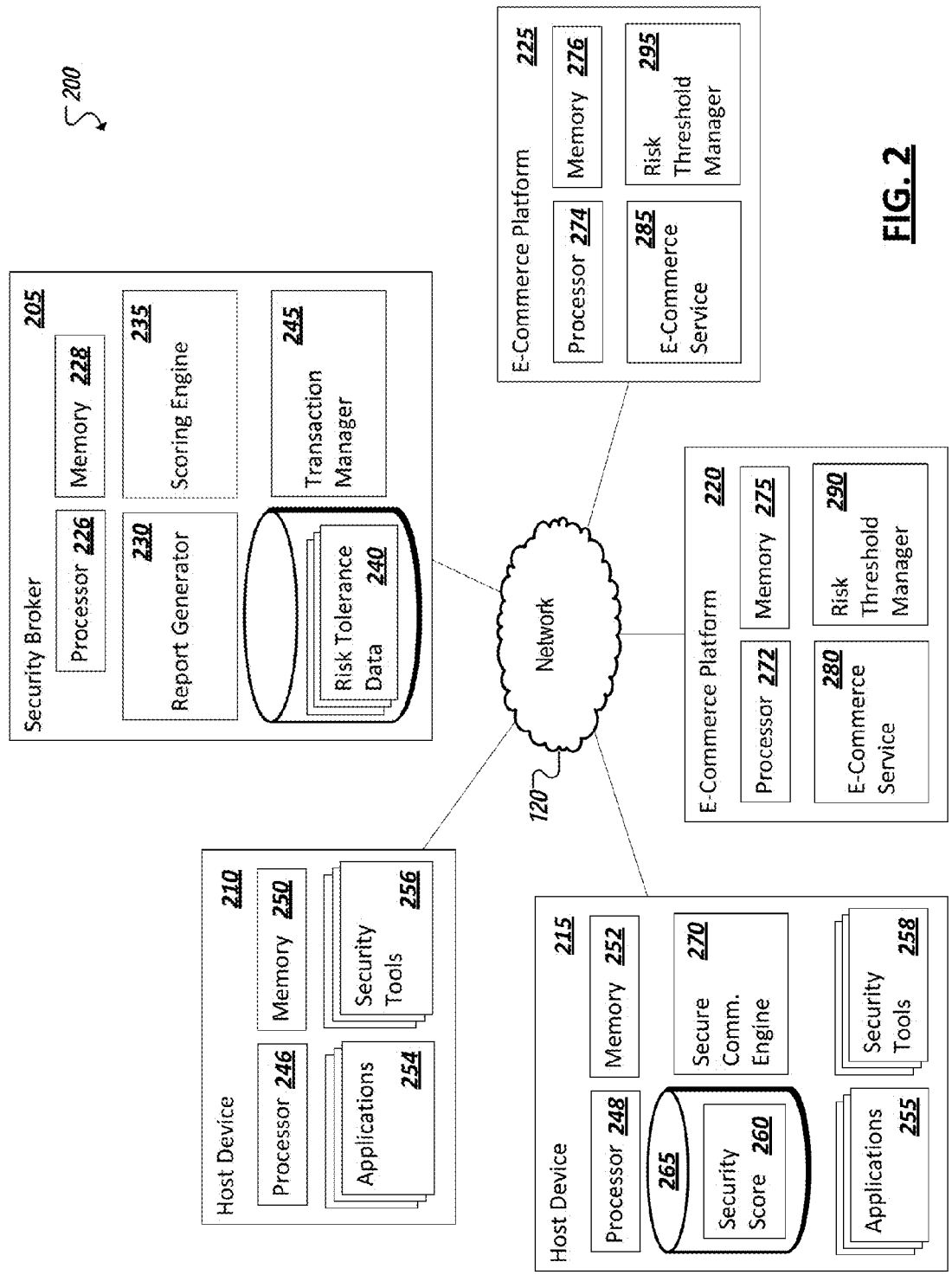

SECURITY BROKER

TECHNICAL FIELD

This disclosure relates in general to the field of computer security and, more particularly, to risk assessment in ecommerce transactions.

BACKGROUND

The Internet has enabled interconnection of different computer networks all over the world. The ability to effectively protect and maintain stable computers and systems, however, presents a significant obstacle for component manufacturers, system designers, computer and network operators. This obstacle is made even more complicated due to the continually-evolving array of tactics exploited by malicious software authors as well as the never-ceasing development of new computing devices and software vulnerable to such threats. Risk can be assessed for computing devices and environments and may be based on the vulnerabilities present on the respective computing device as well as threats to which a computing device is exposed. For instance, risk can be assessed within an enterprise computing environment based on risk present in the respective computing devices and networks within the enterprise computing environment. In such instances, administrators can utilize risk scores computed for their systems and environments to appreciate what types of security weaknesses and risk face the systems, together with the amount of risk, and the devices most affected by risk within the system. Consumer security tools also exist for use on private and home computers and networks that can provide risk assessments of such private computing devices and networks.

Through the identification of risk on computing devices, system owners and administrators can apply certain remedies to counteract or fix vulnerabilities and deficiencies in their systems. However, given the increasing interconnection of devices, systems transact and communicate more and more with other systems, including systems undergoing less vigilant risk assessment and management. Accordingly, while a system owner or manager can employ proactive risk and security management to their own system, they are, at some level, also at the mercy of other systems with which they interact, potentially exposing their systems to threats and risk from these external systems and activities.

BRIEF DESCRIPTION OF THE DRAWINGS

FIG. 2 is a simplified block diagram of an example computing system including an example security broker in accordance with at least one embodiment;

Like reference numbers and designations in the various drawings indicate like elements.

DETAILED DESCRIPTION OF EXAMPLE EMBODIMENTS

Figure 1:
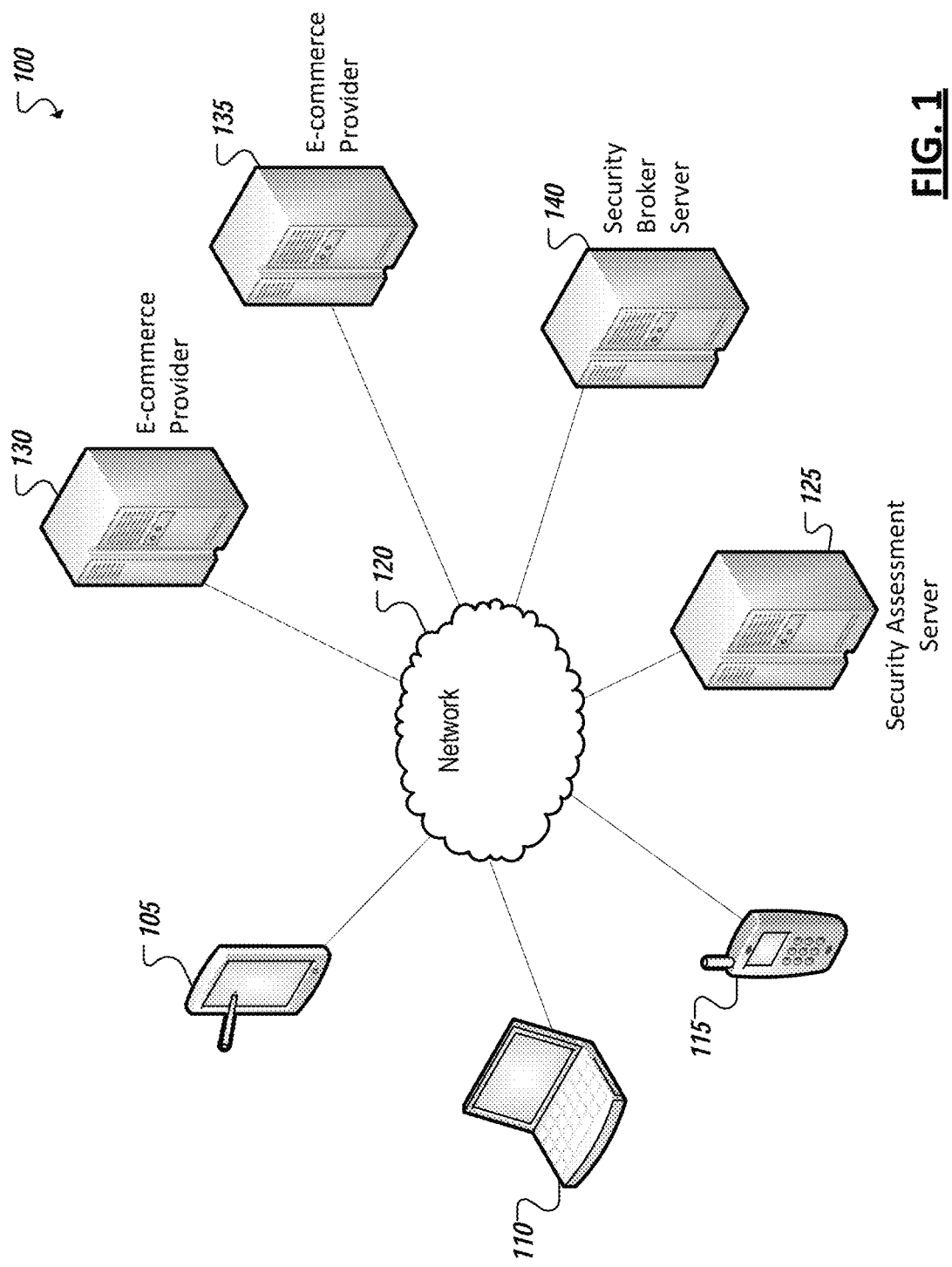
FIG. 1 is a simplified schematic diagram of an example computing system including functionality for providing security brokering in accordance with at least one embodiment.

FIG. 1 is a simplified block diagram illustrating an example computing system 100 including end-user host devices 105, 110, 115 for which corresponding security assessments can be performed and security profiles generated. The security scores can be based on the corresponding security-related system attributes of the host devices determined from security data originating from the host devices 105, 110, 115 themselves (and tools local to the host devices 105, 110, 115), and/or other services, devices, and entities outside the host device, such as network elements (e.g., of network 120), remote applications, services, and software tools that interact with, monitor, communicate with, or are used by the host devices 105, 110, 115. In some implementations, system 100 can include one or more security assessment servers 125 which can collect security data relating to one or more host devices (e.g., 105, 110, 115) and generate a security profile for each host device based on an assessment of the security data. In some implementations, the security profile can be a security score. Additionally, security assessment server 125 can be utilized to provide a neutral security profile for the host device (e.g., 105, 110, 115) that is insulated from influence by outside software vendors and system security providers with incentives for favorable risk and security assessments (e.g., to promote the sale of a particular security product or under-assess risk associated with vulnerabilities or deficiencies of particular software or hardware utilized on the assessed system).

System 100 can further include one or more ecommerce provider systems (e.g., 130, 135) with which host devices (e.g., 105, 110, 115) can interact in connection with the completion of ecommerce transactions (e.g., between the user of a host device (e.g., 105, 110, 115) and a commercial enterprise selling goods and services online). Ecommerce providers can maintain system 130, 135 adapted to communicate with multiple customer host devices, in some cases simultaneously and in parallel. Indeed, some modern ecommerce provider systems complete thousands of transactions per day with thousands of different customer host devices. Such frequent and varied exposure to various host devices can potentially expose the ecommerce provider systems (e.g., 130, 135) to a variety of threats including hacks, viruses, malware, data intrusion attacks. However, many ecommerce providers, in order to maximize revenue generated through their ecommerce platforms, are sensitive to user experience and are careful not to make the initiation and completion of ecommerce transactions through their platforms too difficult or unfriendly. This welcoming posture, unchecked, can result in security threats presented through interactions with poorly-managed or malicious client devices that the ecommerce platform is potentially hesitant to confront. As a result, in some instances, ecommerce vendors respond by imposing additional (and sometimes off-putting) authentications on potential customers in connection with the completion of an ecommerce transaction, among other examples.

In some implementations, a security broker system 140 can be provided with which an ecommerce system (e.g., 130, 135) can coordinate with to assess, on behalf of the ecommerce system, risk associated with transacting with a particular customer host device (e.g., 105, 110, 115). In theory, an ecommerce system (e.g., 130, 135) could solicit security data or security profiles directly from customer host devices to assess the riskiness of a transaction with the customer host devices. Such direct risk assessments by ecommerce providers or other service providers, however, can introduces a variety of issues. For instance, a security profile or security data received directly from a customer host device could be manipulated or otherwise compromised by the host device, calling the reliability of the data and security assessments based on the data into question. Further, legitimate actual and potential customers of the ecommerce provider may balk at frequenting the ecommerce platform's site if they expect to have to share information relating to the system configurations and attributes of their device. Further, customers' privacy may also be impinged by a direct security assessment or sharing of security-related data with an ecommerce provider. Such concerns can be further founded in a fear that an ecommerce provider could misuse such information, such as to take advantage of or disclose a particular identified vulnerability in the customer host device shared with or detected by the ecommerce system in a direct risk assessment.

In some implementations, a security broker system 140 can maintain trusted relationships with ecommerce providers and perform security assessments of potential customers on behalf of the ecommerce provider to thereby verify the veracity of information relating to security of a particular host device and hiding sensitive user and system configuration information of the host device from the ecommerce provider, among other advantages. In some implementations, host devices can register or otherwise establish a trusted relationship with a security broker system (or other system with which the security broker cooperates (such as security assessment system 125)) to encourage participation by the host devices and assist in insuring trustworthy security assessments of the host devices. In addition, to incentivize participation or registration of customer host devices with security broker system 140, ecommerce providers can themselves offer rebates, special offers, and other incentives based on the completion of a risk assessment for the customer device using the security broker system 140 among other examples, including those discussed elsewhere herein.

In some implementations, system 100 can further include tools (not shown) for use in connection with the risk assessment and risk scoring of end-user host devices 105, 110, 115, including security tools and services already deployed on or servicing the host devices 105, 110, 115. Security data can be collected from the host devices 105, 110, 115 as well as other sources (e.g., network elements, security tools, and other services and entities with which the host devices interact), the security data describing attributes of the respective host devices (e.g., 105, 110, 115) relevant to assessing security of the host devices. Such security data can be accessed or obtained directly from the host device and describe such attributes as the host device's operating system, hardware, installed software, deployed countermeasures, detected vulnerabilities, etc. Additionally, in some implementations, security data can be obtained from security tools and other entities remote from the host devices but collecting information from and/or concerning attributes of the host devices. Security data from remote sources can supplement security data obtained internally from the host device. Security data, originating either local to or remote from a host device, can then be used by a security assessment server 125 or other tool to generate a security profile or security score for a corresponding host device, in some cases identifying those attributes or categories of attributes of the device that negatively and/or positively affect the device's security. In some instances, at least a portion of the security assessment server 125 can be provided locally on the host device and/or remote from the host device.

The generation of security profile or security scores for a host device can include the identification and assessment of threats and/or vulnerabilities affecting the device or system and the consideration of countermeasures potentially mitigating against risks derived from the identified threats and vulnerabilities. A threat can broadly refer to something that causes, attempts to cause, or potentially could cause a negative impact to an objective or an asset. For example, a threat may include malware that could disrupt business operations, a natural disaster, an organization that is targeting a person, industry, etc., or even a partner or vendor that has been compromised. A vulnerability can generally include any weakness or condition that can be affected by or exploited by a threat. A vulnerability may include, for example, misconfigured software or hardware; an employee susceptible to manipulation, temptation, or persuasion; inadequate security measures, password protections, etc., or a facility housing the system and assets not being equipped with adequate security measures such as a fire extinguishers, locks, monitoring equipment, etc. or other adequate security measures. A countermeasure can include anything that can mitigate a vulnerability or threat, such as antivirus software, intrusion protection systems, a software patch, a background check, hardware upgrades, network security tools, password strength, encryption schemes, among many other examples both deployed locally at the device or on other, remote devices, such as network elements, used or in communication with the device.

Quantitative risk assessment, in some instances, can include the evaluation of both the magnitude of the potential impact (e.g., loss or harm) to an asset, and the probability that an event will cause the impact. The combination of these components can be used to create a risk metric that is both forward-looking and has predictive capabilities. The ability to predict allows for identification of risk metrics relating to various assets within an operating environment or the operating environment as a whole, as well as allowing for prioritization of tasks to reduce risk, which is the foundation of in connection with risk management of the operating environment. Managing risk can include identifying, characterizing, and assessing threats; assessing vulnerability of assets to specific threats; determining the risk to specific assets based on specific vulnerabilities and threats; and implementing strategies for reducing or eliminating the risk, including the identification of countermeasures that wholly or partially eliminate a threat or vulnerability responsible for a particular risk.

A security profile or security score (collectively "security profile data") generated, for instance, by a security assessment server 125 for a particular host device (e.g., can be utilized by a security broker 140 to determine whether the particular host device meets certain threshold standards of security required or desired by a particular ecommerce provider. The security broker 140 can make such an assessment and provide a security report or security assessment result to the ecommerce provider indicating, in general terms, whether the particular host device has met one or more thresholds defined for the ecommerce provider. Such reports could withhold from the ecommerce provider more detailed configuration and identification information relating to the host device while communicating the results of the assessment.

In some instances, the assessment by the security broker 140 and the generation of a corresponding security report for a particular host device can take place in response to an attempt by the particular host device (or the ecommerce provider) to initiate a transaction. Further, on the basis of such security report data, an ecommerce provider can perform certain actions when engaged in a potential transaction with the particular host device. For instance, the ecommerce provider can complete or deny a transaction based on the report, demand additional transaction steps or information from the customer (or allow such steps to be skipped), provide discounts or other offers, and other actions based on the security report.

In general, "servers," "clients," "computing devices," "host devices," "endpoint devices," "network elements," "hosts," and "systems," including host and server devices in example computing environment 100 (e.g., 105, 110, 115, 120, 125, 130, 135, 140, etc.), can include electronic computing devices operable to receive, transmit, process, store, or manage data and information associated with the computing environment 100. As used in this document, the term "computer," "processor," "processor device," or "processing device" is intended to encompass any suitable processing device. For example, elements shown as single devices within the computing environment 100 may be implemented using a plurality of computing devices and processors, such as server pools including multiple server computers. Further, any, all, or some of the computing devices may be adapted to execute any operating system, including Linux, UNIX, Microsoft Windows, Apple OS, Apple iOS, Google Android, Windows Server, etc., as well as virtual machines adapted to virtualize execution of a particular operating system, including customized and proprietary operating systems.

Further, servers, clients, network elements, systems, and computing devices (e.g., 105, 110, 115, 125, 130, 135, 140, etc.) can each include one or more processors, computer-readable memory, and one or more interfaces, among other features and hardware. Servers can include any suitable software component or module, or computing device(s) capable of hosting and/or serving software applications and services (e.g., security assessment server 125, ecommerce servers 130, 135, and security broker 140, etc.), including distributed, enterprise, or cloud-based software applications, data, and services. For instance, in some implementations, a security assessment server 125, security broker 140, or other sub-system of computing system 100 can be a cloud-implemented system configured to remotely host, serve, or otherwise manage data, software services and applications interfacing, coordinating with, dependent on, or used by other services and devices in system 100. In some instances, a server, system, subsystem, or computing device can be implemented as some combination of devices that can be hosted on a common computing system, server, server pool, or cloud computing environment and share computing resources, including shared memory, processors, and interfaces.

Host, endpoint, client, or client computing devices (e.g., 105, 110, 115, etc.) can include traditional and mobile computing devices, including personal computers, laptop computers, tablet computers, smartphones, personal digital assistants, feature phones, handheld video game consoles, notebook computers, desktop computers, internet-enabled televisions, and other devices designed to interface with human users and capable of communicating with other devices over one or more networks (e.g., 120). Such devices can also include computer-assisted, or "smart," appliances, such as household and industrial devices and machines that include computer processors and/or one or more software programs executed by the computer processors that control, monitor, assist, supplement, or otherwise enhance the functionality of the devices. Computer-assisted appliances can include a wide-variety of computer-assisted machines and products including refrigerators, washing machines, automobiles, HVAC systems, industrial machinery, ovens, security systems, and so on.

Attributes of host computing devices, computer-assisted appliances, servers, and computing devices generally can vary widely from device to device, including the respective operating systems and collections of applications, security tools, and other software programs loaded, installed, executed, operated, or otherwise accessible to each device. For instance, computing devices can run, execute, have installed, or otherwise include various sets of programs, including various combinations of operating systems, applications, plug-ins, applets, virtual machines, machine images, drivers, executable files, and other software-based programs capable of being run, executed, or otherwise used by the respective devices. A similarly diverse array of hardware can be utilized and included in host computing devices, including a variety of different chip sets, ports, display devices, network interface hardware, input devices, peripherals, and other hardware-based components. Graphical display devices and user interfaces, supported by computer processors of the host devices, can further allow a user to view and interact with graphical user interfaces of applications and other programs provided in system 100, including user interfaces and graphical representations of programs interacting with applications hosted within the host devices, as well as graphical user interfaces associated with remote servers, etc. Moreover, while system devices may be described in terms of being used by one user, this disclosure contemplates that many users may use one computer or that one user may use multiple computers.

While FIG. 1 is described as containing or being associated with a plurality of elements, not all elements illustrated within computing environment 100 of FIG. 1 may be utilized in each alternative implementation of the present disclosure. Additionally, one or more of the elements described in connection with the examples of FIG. 1 may be located external to computing environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Turning to FIG. 2, a simplified block diagram 200 is shown illustrating an example implementation of a security broker 205 in use within a system including multiple potential customer host devices (e.g., 210, 215) and ecommerce platforms (e.g., 220, 225) communicating over a network (e.g., 120), such as the Internet. An example security broker 205 can include one or more processors 226 and one or more memory elements 228, as well as components and entities such as a security report generator 230, scoring engine 235, risk tolerance records 240, transaction manager 245, as well as potentially additional components and related functionality. A security report generator 230, in connection with an attempted ecommerce transaction between a particular host device (e.g., 210, 215) and a particular ecommerce system (e.g., 220, 225), can generate a security report for the transaction and communicate the security report to the particular ecommerce system to report to what extent a particular host device complies with risk tolerance thresholds and policies set by the ecommerce provider. This can be achieved generally, for instance, by accessing risk tolerance policy data 240 maintained for the particular ecommerce provider and comparing security profile data describing security characteristics of the particular host device against the risk tolerance policy data 240. The security broker 205 can maintain risk tolerance policies 240 for a plurality of different ecommerce platforms 220, 225 and ecommerce providers and generate security reports in connection with a variety of different transactions involving a variety of different customers and customer devices, including ecommerce transactions of varying types.

In some implementations, an example security broker 205 can utilize an example scoring engine 235 to obtain security profile data for a particular host device (e.g., 210, 215) in connection with the generation of a particular security report. In some instances, security profile data can be pre-generated and provided to the security broker 205 through the scoring engine 235. In other instances, the scoring engine 235 can calculate, at least in part, the security profile data for use in the generation of a security report. For instance, a scoring engine 235 can access data describing attributes of a particular host device and generate security profile data for the particular host device based on the described attributes. In some implementations, security profile data (or attribute data) can be provided to the security broker via secure and trusted mechanisms in an attempt to ensure trustworthiness (and accuracy) of the data describing the security-related characteristics of a particular host device. For instance, security profile data (or attribute data) can be provided through a trusted source (e.g., a neutral security assessment engine (e.g., 125)), such as a source that has collected data directly from the host device and/or has a trusted relationship with the host device. Further, secure communication channels and/or secure data stores can be used to extract, collect, and store security profile data and/or attribute data directly from the host device, the secured features protecting against manipulation and compromising of the data at the host device prior to delivery to and use by the trusted source and/or security broker 205.

Security profile data of a host device accessed by the security broker 205 can be assessed against one or more risk tolerance policies 240 to determine whether transacting with the host device presents a level of risk in excess of risk tolerated by a corresponding ecommerce provider. The results of this assessment can be documented in a security report communicated to the ecommerce provider. While security profile data can identify more specific attributes of the host device at varying levels of detail, such details can be withheld from generated security reports so as to keep more sensitive information concerning specific attributes and configurations of the host device (or attributes of its user) hidden from the ecommerce provider.

Risk tolerance policy data can specify conditions or security thresholds defined for a particular ecommerce provider. In some implementations, risk tolerance data can specify a plurality of certain host device attributes or vulnerabilities that are unacceptable to or not favored by the particular ecommerce provider, as well as particular attributes that are desirable. As an example, security profile data that indicates the presence of such an undesirable attributes at a host, a certain number of such attributes above a set threshold, or certain combinations of such attributes, as defined in risk tolerance policy data, can result in the security broker 205 generating a security report that fails or scores the host device at a certain level and reports these findings to the related ecommerce provider. The security report can generically identify that the host device fell short of certain general risk levels or conditions set in the risk tolerance data without detailing the specific basis for the determination and the generated report.

In other instances, risk tolerance data can dictate thresholds mapped to particular security scoring schemes that further abstract the specific security-related attributes of the host device. For instance, risk threshold data can reference a pre-defined security scoring scheme or standard and request identification of host devices that fall below a certain threshold score, within one or more ranges of security scores, etc. Further, in some implementations, a security score can include multiple category-specific scores. For example, a single security scoring scheme can include sub-scores such as a network-related security score, password-related security score, hardware-related security score, application-related security score, etc. In such examples, risk tolerance data can set a threshold for each of the sub-scores (or event multiple thresholds within a single sub-score category).

Multiple risk thresholds can be defined for a single ecommerce provider. For instance, an ecommerce provider can offer a variety of different services, products, and even online storefronts. Depending on the type and nature of a particular transaction, different risk thresholds can be defined. For instance, an ecommerce provider can set a first risk tolerance threshold for lower value transactions (e.g., under a certain dollar amount) and a second risk tolerance threshold for higher value or high exposure transactions (e.g., transactions above the dollar amount, transaction involving the extension of credit, etc.). In other examples, an ecommerce provider can set varying risk thresholds based, for instance, on the method of payment offered the customer in the transaction, the type of product or service to be purchased in the transaction, the return policy applied to the purchase, etc.

Example implementations of security broker 205 can include a transaction manager 245 that identifies the nature of a transaction for which a security report is to be generated. For instance, an example transaction manager 245 can identify the type of transaction, for instance, from data (transaction data) received from the ecommerce platform (e.g., 225) and/or customer host device (e.g., 210, 215), as well as the identity of the involved ecommerce provider, and the identity of the customer host device. This information can be collected using the transaction manager 245 and used in the generation of a security report. In some instances, a security report can be generated in response to each transaction. In other instances, using the security broker 205 can identify a particular host device and identify further that the host device has recently been assessed by the security broker (e.g., within a predefined period of time). From the determination, the security broker 205 can reuse a previous security report. In some instances, the security broker 205 can determine that a host device identified in the transaction data has out-of-date (or no known) security profile data for use by the security broker, causing the security broker to request (e.g., from a remote or local security assessment engine, scoring engine, security data repository) or generate security profile data for the host device. Additionally, among other uses, transaction data can be used to identify from a set of risk tolerance data for a ecommerce provider, particular risk tolerance data defining thresholds for the particular type of transaction.

In some implementations, transaction data can be received by the security broker 205 from the host device participating in the attempted transaction with an ecommerce provider. The ecommerce provider can pass a transaction identifier to the host device to forward to the security broker 205. The security broker 205 (e.g., using transaction manager 245) can process the transaction identifier to identify, among other information, the identification of the ecommerce provider and the type of transaction. The security broker can then send the responsive security report to the ecommerce provider referencing the received transaction identifier, allowing the ecommerce provider to relate the received security report to the proper transaction type, corresponding transaction and host device. In other instances, transaction data can be received by the security broker 205 from both the participating host device and ecommerce provider in a transaction, which the security broker 205 can use to corroborate a security report generation request and identify the transaction and transaction attributes (e.g., ecommerce provider identifier, host device identifier, transaction type, time of the transaction, etc.) for the requested security report generation request.

Example ecommerce platforms (e.g., 220, 225) operated by ecommerce providers can include processors (e.g., 272, 274) and memory elements (e.g., 275, 276), together with various other hardware and software components including, for instance, an ecommerce service (e.g., 280, 285), risk threshold manager (e.g., 290, 295), and other components and functionality, such as modules configured to generate transaction data for use by a security broker 205 in the generation of a security report for a related transaction. Ecommerce services 280, 285 can include those modules, databases, database managers, programs, and resources used by an ecommerce provider to launch and manage ecommerce platforms of the ecommerce platform including the online websites, storefronts, and other interfaces for interacting with and conducting ecommerce transactions with existing and potential customers and the host devices (e.g., 210, 215) of the customers.

Example ecommerce platforms 220, 225 can further include, in some implementations, a risk threshold manager (e.g., 290, 295) that includes functionality for managing risk tolerance policies used by the security broker 205 in the generation of security reports. In some implementations, an example risk threshold manager 290, 295 can allow one or more users, such as administrators of the ecommerce provider, to specify particular conditions, host device attributes, security scores, and other information that can be used to build risk tolerance policy data for one or more transactions types or storefronts of the ecommerce provider. In some implementations, risk threshold manager 290, 295 can generate the risk tolerance policy data and communicate the risk tolerance policy data to one or more security brokers (e.g., 205). In systems including multiple security brokers, such as security brokers run by different competing providers, risk threshold manager 290, 295 can generate risk tolerance policy data and tailor other communications to respective security brokers based on the specific schemes employed (and security profile data considered) by each respective, different security broker. In other implementations, risk threshold manager 290, 295 can provide risk threshold information, select preferences, or provide other information for use by the security broker 205 in generating risk tolerance policy data for the ecommerce provider, among other implementations and alternatives.

Host devices 210, 215 can include any variety of computing devices, including user host devices such as handheld and desktop personal computing devices and automated computer-controlled host devices, capable of interacting with ecommerce platforms 220, 225 and attempt, legitimately or illegitimately, to conduct an ecommerce transaction with the ecommerce platform. In some instances, a host device can be utilized by a malicious entity, such as in a spoof attack, to compromise, hack, or otherwise attack an ecommerce platform. Generally, host devices 210, 215 can include one or more processor devices (e.g., 246, 248) and one or more memory elements (e.g., 250, 252), as well as other software and hardware components providing various functionality, such as various applications (e.g., 254, 255), security tools (e.g., 256, 258), operating systems, peripherals, and other components, such as a secure communication platform 270, among other examples.

Attributes of an individual host device (e.g., 210, 215) can be dependent on the software installed, used, and accessed by the respective host device (e.g., applications 254, 255), the networks accessed by the host device, hardware components of the host device, users of the host devices, security tools (e.g., 256, 258) deployed or used by the host device, etc. Data describing such attributes (e.g., attribute data) can be collected by the host device, security tools (e.g., 256, 258) accessing the host device, and/or security assessment and scoring engines in connection with the generation of security profile data for the host device. Security tools (e.g., 256, 258) deployed on or used by the host device, can include programs and services local to and remote from the host device, including such security tools as antivirus software, encryption tools, web browser security tools, password protection tools, antimalware detection and removal tools, firewalls, web gateways, mail gateways, host intrusion protection (HIP) tools, data loss prevention (DLP) tools, vulnerability managers, policy compliance managers, among others.

In some implementations, security attribute data, such as security scores, generated for a host device can be maintained on the host device itself. For instance, in one example, to ensure neutrality and trustworthiness of security attribute data (e.g., 260) determined for a host device 215 and describing security of the host device 215 can be generated by a neutral third party (e.g., security assessment service 125, etc.) or another service outside the host device 215 itself. The results of the security assessment can be made accessible on the host device 215, for instance, to inform users of the host device of security conditions on the host device. For instance, security scores and other profile data can be generated both for use on the host device as well as in connection with the generation of security reports by a security broker, including security scores and security profile data described, for instance, in U.S. patent application Ser. No. 13/718,200, filed Dec. 18, 2012, entitled "User Device Security Profile," which is hereby incorporated by reference in its entirety as if explicitly set forth herein.

Once a host device 215 receives security attribute data describing security attributes of the host device 215, it can be advantageous to take measures to protect the integrity of the security assessments and scores (e.g., 260) that can serve as the basis for other actions, including remedial actions at the host device 215, as well as in ecommerce transactions utilizing services of an example security broker 205 such as described herein. In some implementations, a host device 215 can include secure memory containers 265, such as memory on secure processing chips or other hardware physically isolated from the operating system and other hardware of the host device. A secure communication manager 270 on the host device 215 can include further functionality allowing for secure, out-of-band communication with other remote entities such as security assessment and scoring services, and the security broker 205 allowing for updates to the security profile data (e.g., 260) to be received securely and for the security profile data (e.g., 260) to be shared securely and free of tampering with other trusted partners (e.g., security broker 205). Additionally, in some implementations, special authentication may be a condition for accessing the profile data dedicated to particular licensed security brokers (and not otherwise available to other entities in the general network). Further, enterprise environments can utilize such data together with policy enforcement and management tools to determine operational criteria for any host device (e.g., 215), among other examples.

Figure 3A:
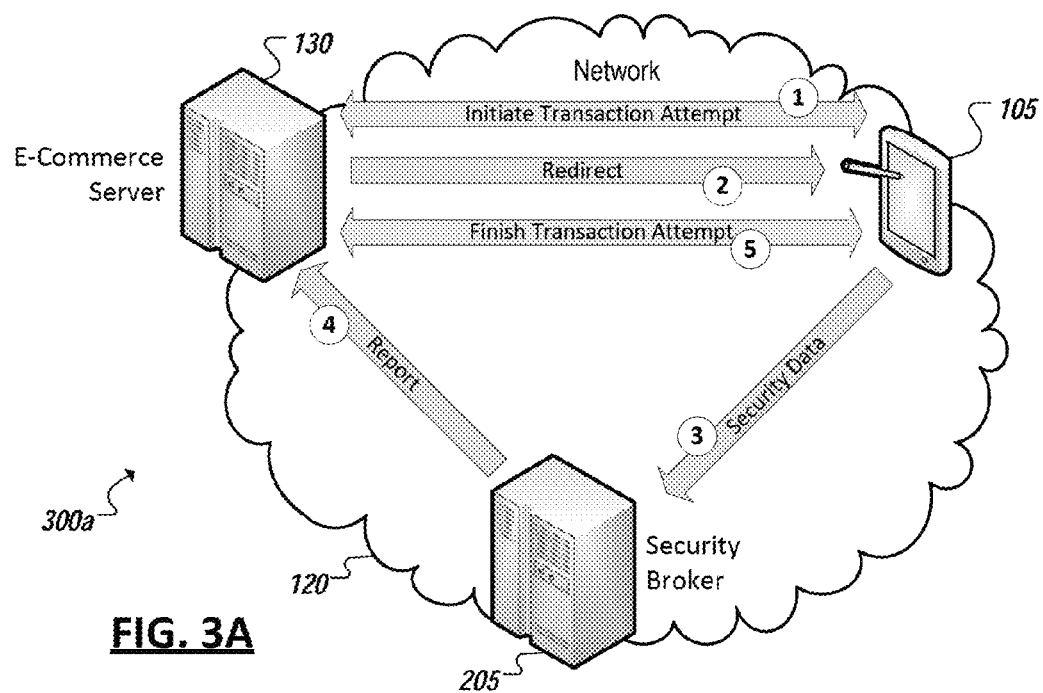
FIGS. 3A-3C are simplified block diagrams illustrating example operations of a security broker in accordance with at least one embodiment.
Figure 3B:
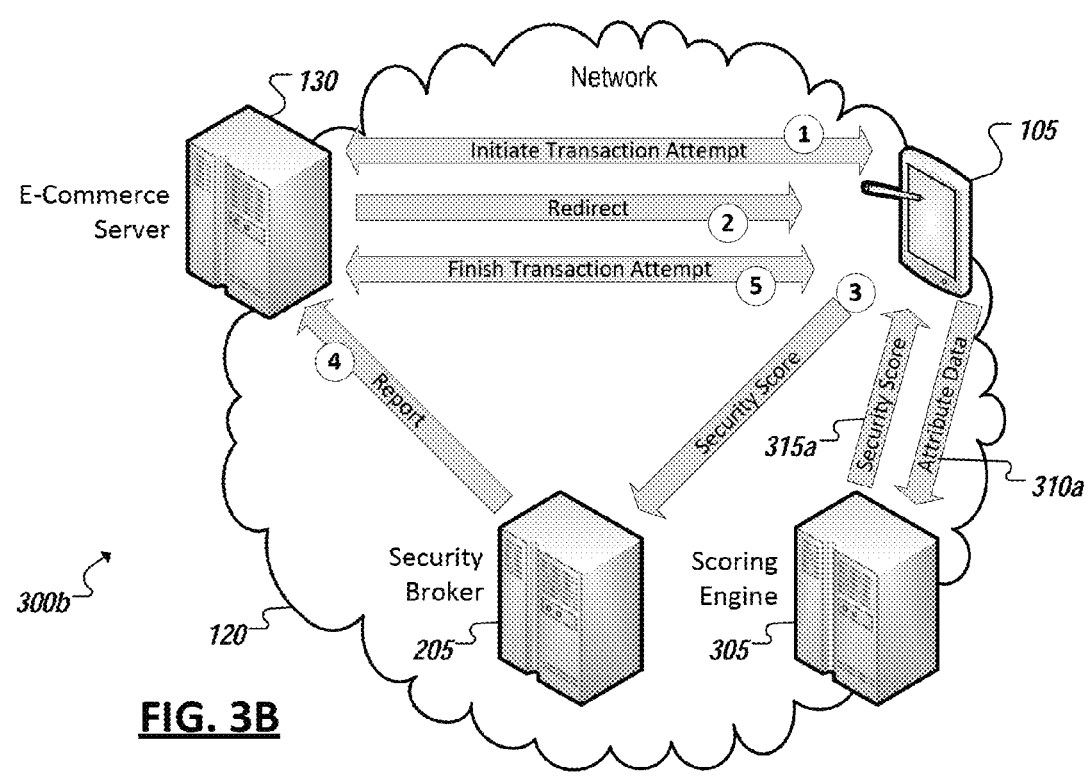
Figure 3C:
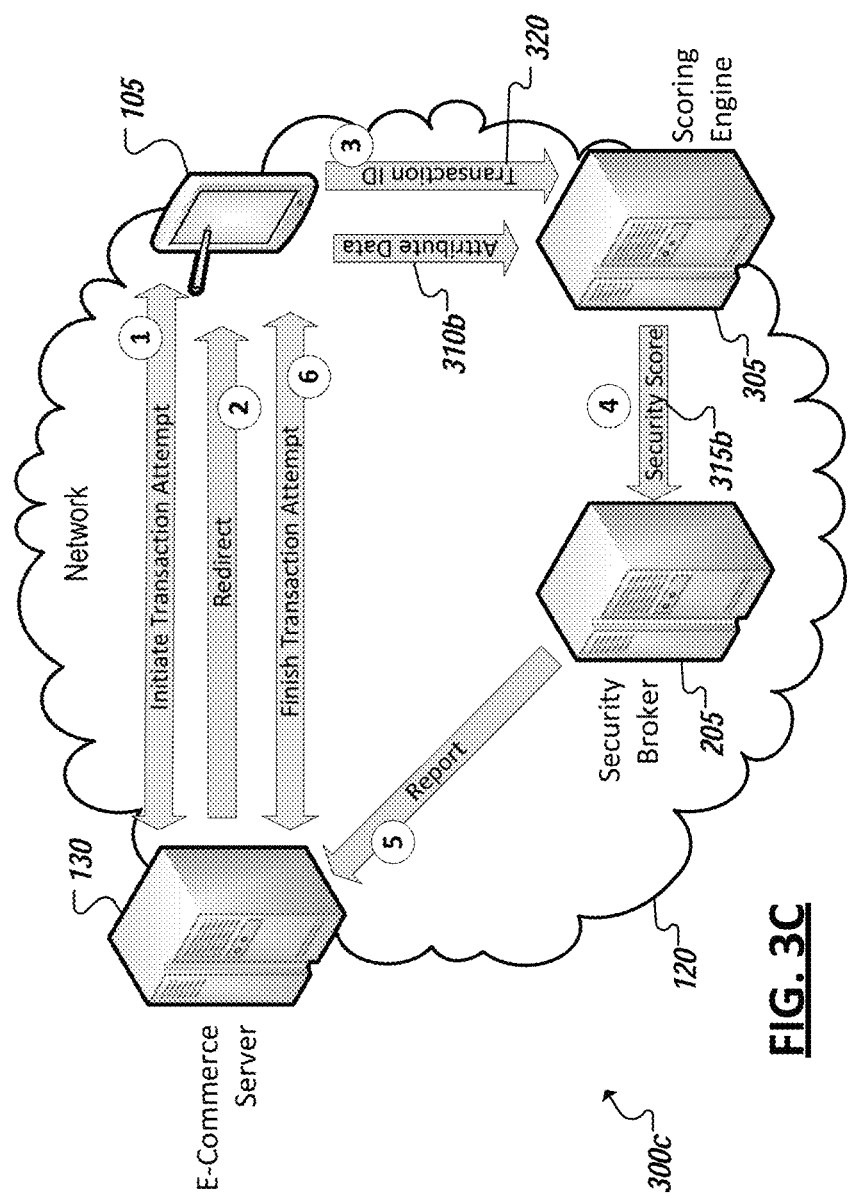

Turning to FIGS. 3A-3C, simplified block diagrams 300a-c are shown illustrating various functionality and example operations of a system including a security broker 205 in example ecommerce transactions. For instance, as shown in the example of FIG. 3A, a particular host device 105, such as a handheld smartphone or tablet computing device, can communicate with an ecommerce platform server 130 in connection with an attempted ecommerce transaction. Such communications can include, as examples, the host device sending a query for particular good or services offered by the corresponding ecommerce provider, the adding of goods or services to an online shopping cart, an attempt to check-out or initiate payment for selected goods or services, or any other communication exchanged between the ecommerce platform server 130 and the host device 105 prior to completion of the transaction.

In response to the initiation of an ecommerce transaction attempt or particular actions prior to and potentially leading up to the completion of the transaction, an ecommerce server 130 can communicate a redirect to the host device in connection with a requested system security check or assessment of the host device. The redirect can cause or request the host device to begin communication with a security broker 205 in connection with the security assessment. In some instances, an ecommerce server 130 can elect to skip such a security check, for instance, if the customer-user of the host device 105 has logged-in as a known registered user, if the identifiers of the host device 105 (e.g., IP address, MAC address, etc.) match or otherwise correspond to previous identifiers of a trusted customer device (e.g., as recognized from previous transactions), among other examples. In such instances, the ecommerce server can continue toward completion of the ecommerce transaction without involvement of the security broker 205. In other implementations, an ecommerce provider can issue a redirect to and involve the security broker in every transaction. Additionally, in some instances, the redirect to the security broker 205 communicated to host device 105 can include transaction data that is to be used or forwarded to the security broker 205 in connection with the security assessment, such as a transaction identification number, an identifier of the corresponding ecommerce provider, an identifier of the transaction type, among other examples. In still other instances, a host device 105 can opt-out of the security-broker-assisted risk assessment, although the host device may, as a result, forfeit certain privileges offered by the ecommerce provider to host devices that agree to participate in the assessment, among other examples.

In response to receiving a redirect message from the ecommerce server 130, an example host device 105 can initiate communications with a security broker 205 identified in the redirect. In some instances, a user of host device 105 can select a particular security broker from a list of accepted security brokers used in connection with the ecommerce server 130, such as a particular security broker 205 with which the host device already has a relationship and trust. In either instance, the host device 105 can communicate security data to the security broker 205 for use by the security broker 205 in determining whether the host device 105 meets certain security standards set by the ecommerce provider as defined in risk tolerance policy data corresponding to the ecommerce provider and particular transaction type. In some instances, security profile data can include a pre-generated security score, while in other instances, security profile data can include data identifying certain attributes of the host device 105 that can be further processed (e.g., at the security broker 205) to derive a particular baseline score or format for comparison against an ecommerce provider's risk tolerance data. Based on this comparison, the security broker 205 can generate and issue a security report to be communicated to ecommerce server 130. As noted above, such a security report can be limited to an abstract reporting of the general state of security of the host device and its performance relative to the ecommerce provider's risk tolerance data without identifying specific attributes, vulnerabilities, configurations, or other features of the host device 105.

In connection with the delivery of a security report to the ecommerce provider 130, the ecommerce transaction between the host device 105 and ecommerce server 130 can be resumed (e.g., through a return or additional redirect) and the transaction attempt can be resolved based on the security report. In some implementations, the results of the security report can affect how the ecommerce server 130 completes the transaction. In some instances, the ecommerce server 130 can simply deny the transaction (e.g., after a negative report) or complete the transaction (e.g., in response to a positive report). The ecommerce server 130 can apply a promotion, discount, or other favorable transaction terms in response to a positive report in some examples. Additionally, in some instances, an ecommerce server 130 can force a host device 105 to participate in more or fewer verification or authentication steps in connection with the transaction such as user or account registration steps, password checks, user verification checks (e.g., to check against bots or other automated clients), and other steps based on the reported relative risk level of the host device. Further, in some instances, a security report can indicate that the host device possesses a security or risk level within a plurality of ranges or levels. Accordingly, varying degrees of action can be taken by the ecommerce server based on the varying degrees of security results that can be reported for a particular host device in a security report, among other examples.

Turning to FIG. 3B, another example is shown of examples operations that can be involved in a security check of a host device by a security broker in connection with a particular ecommerce transaction. As discussed above, in some instances, a security score for a host device can be predetermined and, in some cases, securely stored at the host device and securely communicated to and from the host device utilizing secured hardware on the host device 105, among other examples. In some instances, a scoring engine 305 can be employed by a host device 105 to generate a security score 315a for the host device based on attribute data 310a communicated to the scoring engine 305 describing security-related attributes of the host device 105. This security score can then be used by the host device 105 in connection with a variety of functions including security assessments by an examples security broker 205. For instance, in one example, at least a portion of the security score generated for the host device 105 by scoring engine 205 can be communicated to the security broker 205, for instance, in response to a redirect to the security broker 205 or security assessment request communicated to the host device 105 by the ecommerce server 130. The security broker 205 can use this pre-generated security profile data for the basis of its security report generated in connection with the transaction. In some instance, use of the security profile data can be predicated on a recognized relationship or trust established with the original author of the security profile data or score (e.g., scoring engine 305) and the security broker 205, among other examples.

While in the example of FIG. 3B, the security score or security attribute data generated by an example scoring engine 305 can be communicated to the security broker 205 directly from the corresponding host device 105, in other examples, a scoring engine can communicate this security profile data (or security score, in such instances) to the security broker 205 directly. In some instances, this implementation can be preferable, for instance, to ensure authenticity of the security profile data or trustworthiness of the security profile data (e.g., in instances where secure storage, processing, and communication functionality of the host device is insufficient). For examples, as shown in the example of FIG. 3C, attribute data 310b can be sent to a scoring engine 305 and used as the basis of the generation of corresponding security profile data 315b for the host device 105. In such an example, a redirect to security broker 205 can cause the host device 105 to additionally communicate with scoring engine 305 and request the forwarding of the security profile data 315b to the security broker in connection with a particular ecommerce transaction. Indeed, in some examples, host device 105 can also communicate at least a portion of transaction data (e.g., 320) to the scoring engine 305 identifying the ecommerce transaction for which this request applies, which the scoring engine 305 can reference in communication of security scores 315b to the security broker 205 in response to the host device's request. Further, as in the examples of FIGS. 3A and 3B, the security broker 205 can use received security attribute data as the basis of comparisons with risk tolerance data of the corresponding ecommerce provider and the generation of security reports communicated to the ecommerce server 130.

In some instances, functionality of one or more of the components and devices described herein can be combined. For instance, in one example, scoring engine 305 and security broker 205 can be combined. In such an example, the security broker 205 can receive attribute data, even outside of or before initiation of a particular ecommerce transaction and calculate risk profile data for one or more host devices (e.g., 105). Indeed, security broker 205 can maintain a library of security profile data or security scores for a plurality of different host devices that it can reference in future risk assessments requested of ecommerce providers in connection with ecommerce transactions with the plurality of different host devices. In such instances, the security broker 205 can identify the host device (e.g., 105) involved in the ecommerce transaction and attempt to identify if security profile data exists for the host device and use the security profile data to generate a security report for the transaction.

In some instances, a security broker 205 (or third-party scoring engine or the host device itself) can be used to dynamically generate or update security profile data for a particular host device involved in an ecommerce transaction. For example, it can identified that a security score for the particular host device is out-of-date, expired, or otherwise ready for updating. Additionally, it can be identified that no known security scores (usable by the security broker 205) have been generated or are able to be identified. In such instances, attributes of the host device can be identified in substantially real time, reporting the most current security status and profile of the host device. In some instances, attributes of the host device can change over time thus resulting in the generation of different security profile data (or scores) over the life of the host device. Indeed, security profile data at a first instance can be used to generate a first result (and security report) against a set of risk tolerance data of an ecommerce provider and be updated and used at a second instance to generate a different result (and security report) against the same set of risk tolerance data of the same ecommerce provider. For instance, configurations of a host device can change as new applications are added, malware is uploaded, hardware is updated, patches are released (and either kept up-to-date or not), among other examples.

Further, in some examples, some categories of attributes can be particularly prone to changing regularly and serve as the basis for updates to security profile data for a host device used by a security broker 205. In some instances, a host device 105 can be continuously reassessed, at least partially, to identify its current status and attributes, in particular those attributes known to be prone to regular change or alternation between a set of values. To avoid repeated assessments, in some implementations, multiple security profiles can be generated for a host device a priori in anticipation that conditions at the host device change from transaction to transaction. Such changing attributes of a host device that can affect its security profile can include the network to which it is presently connected during a particular ecommerce transaction. For instance, as the host device migrates from a home network to a public network, it may be determined that the security of the host device has decreased based on the change to the network it uses. Accordingly, different security profile data can be considered for the host device thereby affecting results reported in a security report generated for a particular ecommerce transaction. In another example, the geographical location in which a host device is located can affect the level of security assessed for a host device. In still another example, the identity of the user of the host device can also be considered. In some implementations, users' historical behavior using the host device (and other host devices) can be identified and considered in risk assessments of the host device. Indeed, identifying that a first, less-risky user is the present user of the host device can cause a first set of risk profile data to be applied in risk assessments involving a security broker 205, while identifying a second, riskier user can cause different security profile data to be used that identifies the corresponding higher risk facing the host device and those devices (e.g., ecommerce server 130) interacting with the host device. Accordingly, security at a given host device 105 can be somewhat fluid and changes at the host device can be reported and considered by a security broker in connection with the generation of security reports corresponding to a particular attempted ecommerce transaction involving the host device.

Figure 4A:
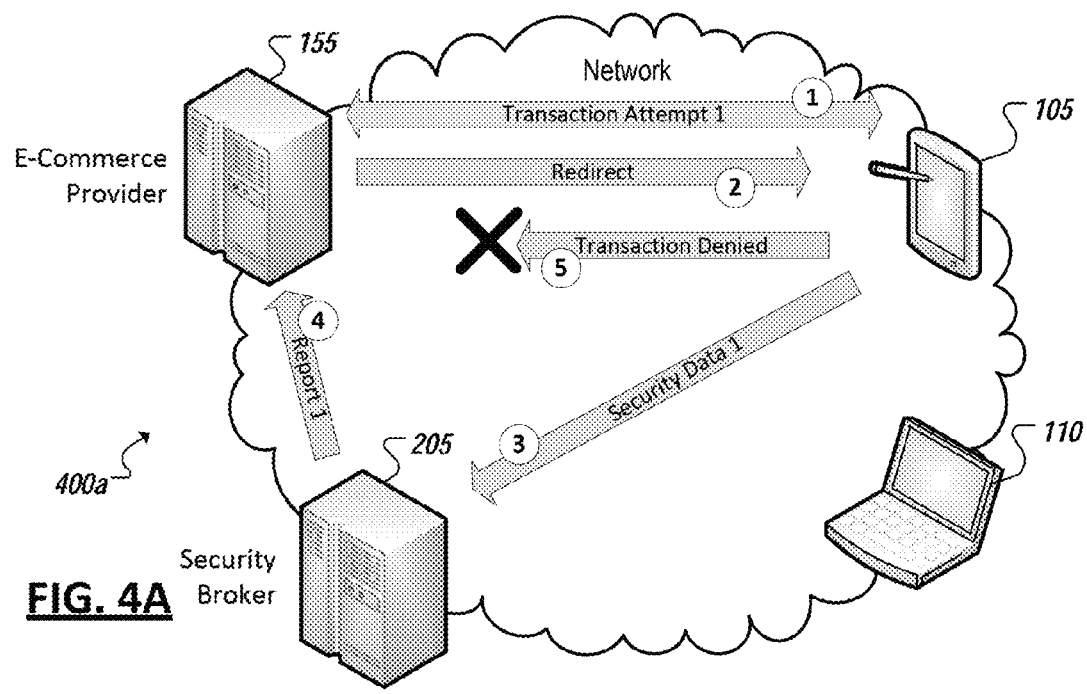
FIGS. 4A-4B are simplified block diagrams illustrating additional example operations of a security broker in accordance with at least one embodiment.
Figure 4B:
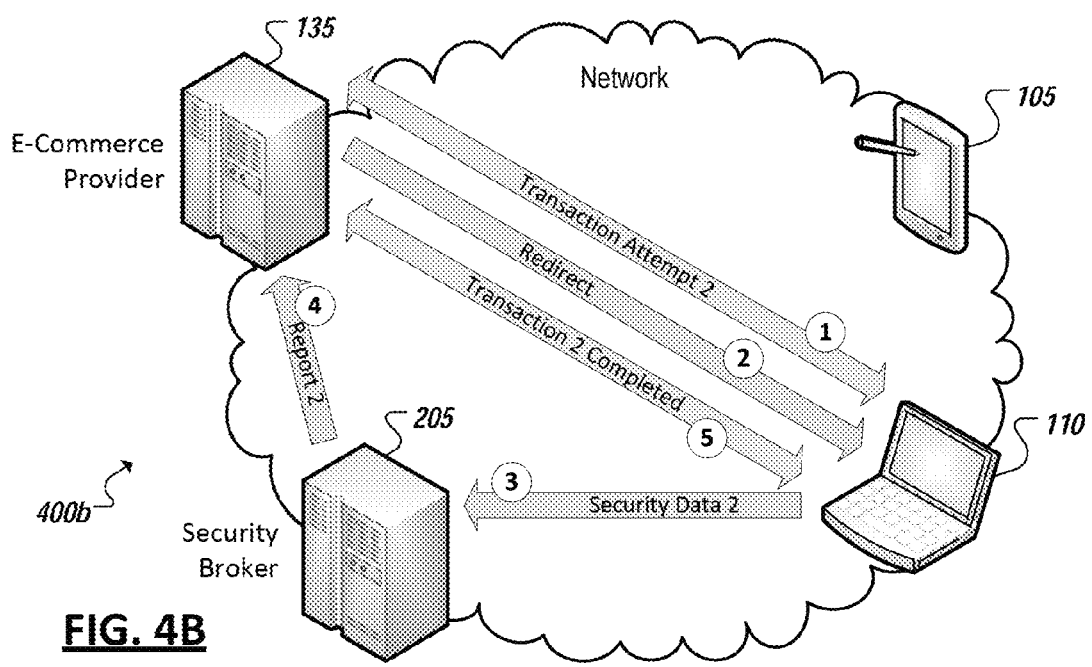

Turning to the examples of FIGS. 4A-4B, multiple host devices 105, 110 can attempt to transact with a single ecommerce provider's system (e.g., 135). As each host device 105, 115 can have its own varying set of security-related attributes, assessments of each host device 105, 115 can yield different outcomes. For instance, in the simplified block diagram 400a of example FIG. 4A, a first host device 105 attempts to engage in an ecommerce transaction with ecommerce platform 135 resulting in a redirect to security broker 205 for a security assessment in connection with the attempted transaction. In the example of FIG. 4A, the security broker 205 assesses security profile data of host 105 and generates a security report based on the security profile data reporting a negative security status of the host device 105 relative to the risk threshold data of the ecommerce provider 135. Accordingly, in the example of FIG. 4A the transaction with the ecommerce provider 135 is denied based on the received security report (i.e., "Report 1").

As shown in the simplified block diagram 400b of example FIG. 4B, a second host device 110 can attempt a similar transaction with the same ecommerce provider leading to another security assessment by the security broker on behalf of the ecommerce provider, this time of the second host device 110 based on corresponding second security profile data (such as a security score generated for the second host device 110 based on identified security-related attributes of the second host device 110). In this instance however, based on the respective security-related attributes of the second host device 110, a more positive security report is generated and acted upon by the ecommerce platform 135 resulting in the successful completion of the attempted transaction (i.e., based on a determination that the second host device was an acceptable safe transaction partner). While the ecommerce provider can identify (from the respective security reports "Report 1" and "Report 2") that the second host device 110 is in better compliance with its security thresholds, as defined in the ecommerce provider's risk tolerance data, the ecommerce provider 135, due to the abstracted and generalized nature of the security reports (e.g., for customer devices 105, 110), may not know why and what precise conditions of the first device 105 caused it to fail the assessment by the security broker 205 or the precise reasons for the determination that the second host device 110 is sufficiently secure (e.g., as defined by the ecommerce provider's security threshold). In this manner, both the privacy and integrity of each of the customer devices 105, 110 can be preserved and withheld from ecommerce providers with which they transact, reserving disclosure of more sensitive technical and security attributes to trusted sources such as scoring engines, assessment engines, security brokers, etc.

Figure 5A:
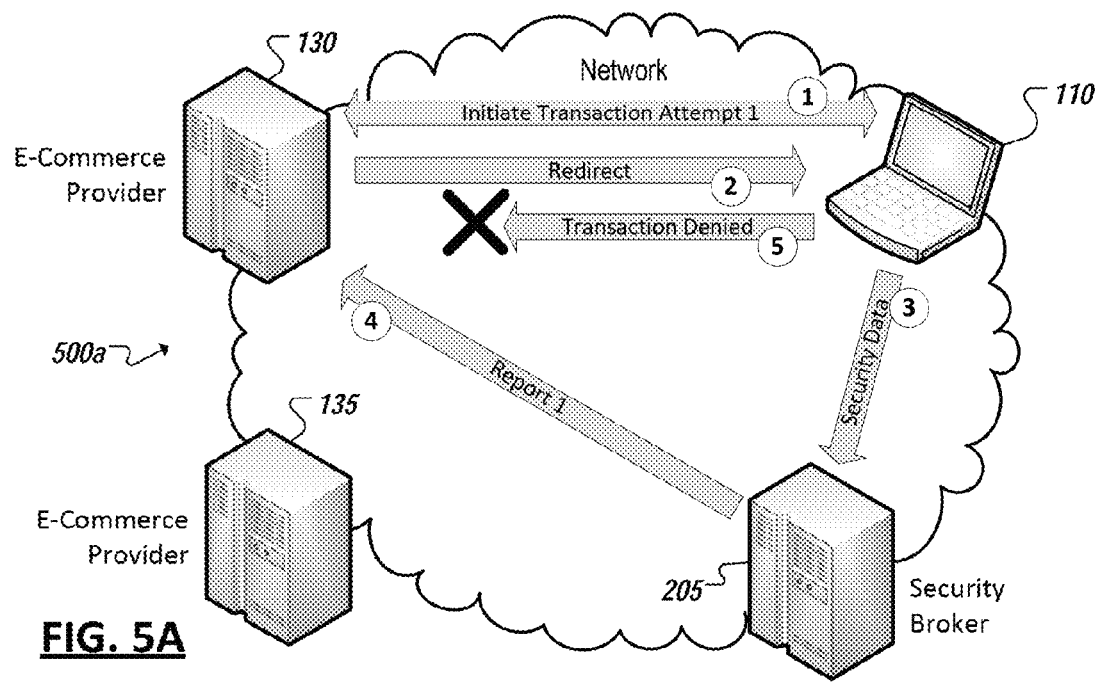
FIGS. 5A-5B are simplified block diagrams illustrating further example operations of a security broker in accordance with at least one embodiment.
Figure 5B:
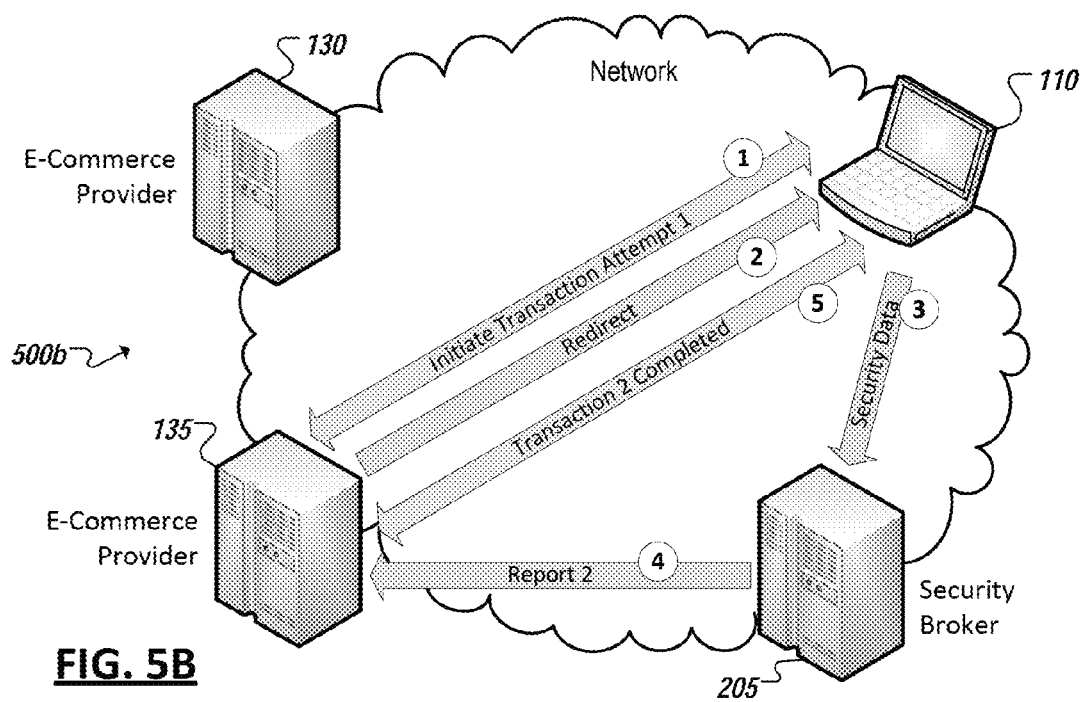

The respective risk tolerance data of a particular ecommerce provider and transaction type can also influence the results of assessments of various host devices' security by a security broker 205. For instance, turning to the examples of FIGS. 5A-5B, a single customer host device 110 can experience different results in attempted transactions with two different ecommerce providers based on the ecommerce providers' respective risk tolerance data defining one or more risk thresholds for one or more different types of transactions of the ecommerce provider. For instance, turning first to FIG. 5A, a block diagram 500a is shown of system including a customer host device 110 attempting to engage in an ecommerce transaction with a first ecommerce provider 130. As in other examples, the first ecommerce provider 130 can respond to an identified attempt to engage in an ecommerce transaction with a redirect that causes the host device 110 to interact with a security broker 205 that analyzes security attributes or scores of the host device 110 against risk tolerance data of the ecommerce provider 130 to generate a security report for the ecommerce provider 130. Based on the security report, the ecommerce provider 130 can determine that the host device is insufficiently secure to grant any one of a variety of privileges potentially offered by the ecommerce provider 130 in the transaction, including the ability to complete the transaction, discounts available to low risk hosts, streamlined transaction and checkout processes, etc. Turning to the example of FIG. 5B, the same host device 110 can later attempt to engage in an ecommerce transaction with a second ecommerce provider 135. As in the example of FIG. 5B, the initiation of the transaction with ecommerce provider 135 can cause the same, or a different, security broker 205 to assess the host device 110 on behalf of the second ecommerce provider 135 and according to risk tolerance data of the second ecommerce provider 135. However, in the example of FIG. 5B, the security broker 205 can determine that the same attributes or scores of host device 110, while falling short of thresholds and preferences embodied in risk tolerance policy data of the first ecommerce provider 130, are in compliance with one or more thresholds of risk tolerance policy data of the second ecommerce provider 135.

As risk tolerance data can be highly individualized to their respective ecommerce provider, security reports can vary similarly in their assessments against the differing risk tolerance data. Indeed, in some implementations, multiple different risk tolerances or thresholds can be defined for multiple different transaction types of a single ecommerce provider, resulting in different security report results for a single customer host depending on the corresponding transaction type. In other implementations, transaction type can be assessed together with other attributes of the customer host by the security broker in connection with generating a security report for the respective transaction.

It should be appreciated that the examples presented above are non-limiting examples provided merely for purposes of illustrating certain principles and features and not necessarily limiting or constraining the potential embodiments of the concepts described herein. For instance, a variety of different embodiments can be realized utilizing various combinations of the features and components described herein, including combinations realized through the various implementations of components described herein. For instance, risk score generation, security attribute data, and other functionality can be provided fully or partially on the host device in some implementations, while score generation can be reserved to services hosted at devices and system remote from the host devices in other implementations. Other implementations, features, and details should be appreciated from the contents of this Specification.

Figures 6A, 6B:
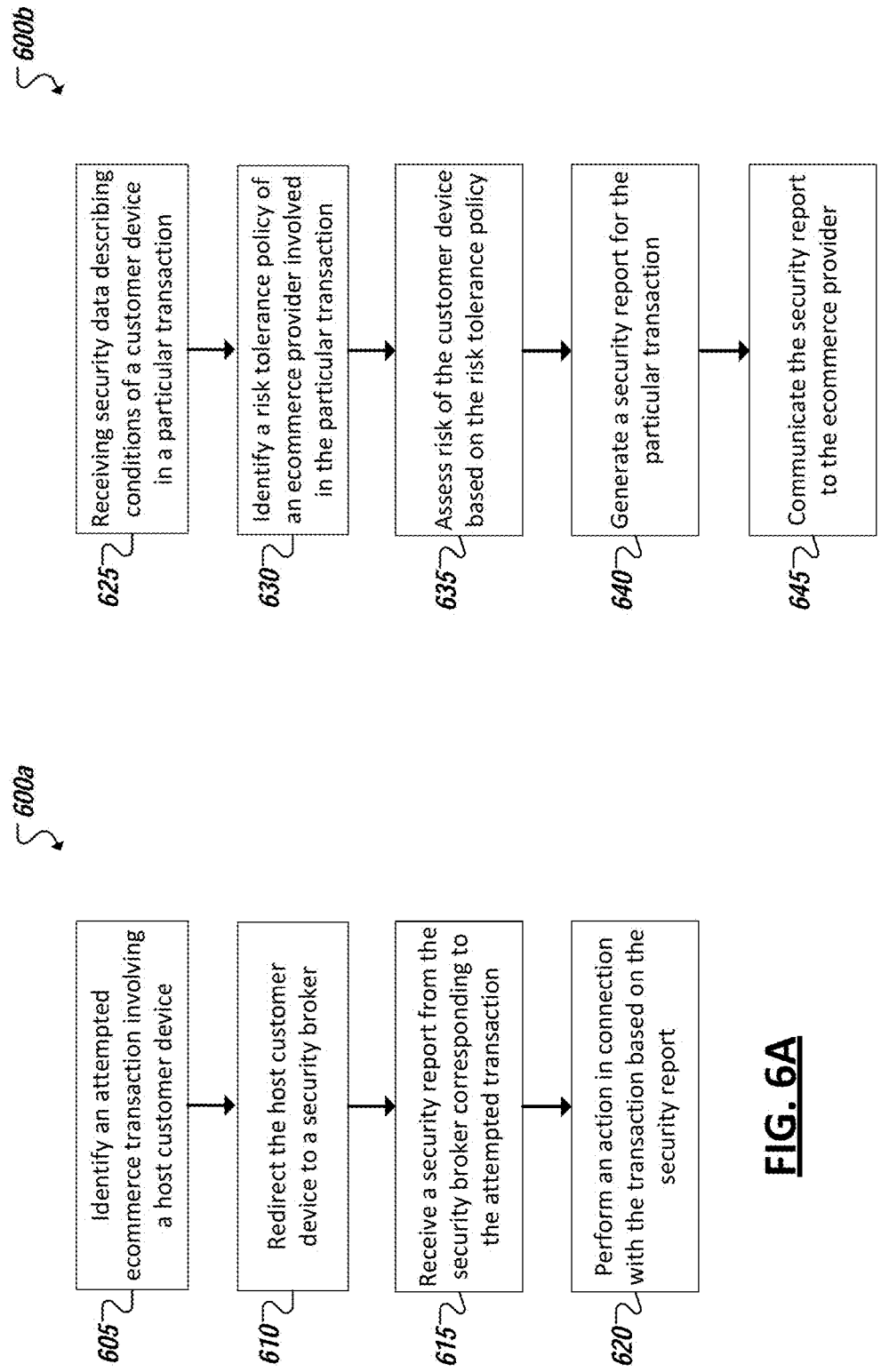
FIGS. 6A-6B are simplified flowcharts illustrating example techniques for providing security brokering in accordance with at least some embodiments.

Turning to FIGS. 6A-6B, simplified flowcharts 600a-b are shown illustrating example techniques involving example security brokers generating security reports for one or more ecommerce transactions involving one or more ecommerce systems. In the example of FIG. 6A, an attempted ecommerce transaction is identified 605 between the ecommerce system of an ecommerce provider and a host device of a potential customer of the ecommerce provider. A variety of activities by either the ecommerce system or host device can be identified in the attempted transaction, including requests from the host device for pages corresponding to the ecommerce provider's online storefront, the addition of items to an online shopping cart, selection of a check-out button, payment options link, among many other examples. A redirect 610 can be sent by the ecommerce system or another system associated with the ecommerce system to the host device causing the host device to initiate involvement of a security broker. For instance, the redirect can cause a host device to send security attribute data to the security broker or to enlist a third party device (such as a trusted security assessment system with knowledge of the host device's relevant attributes) to communicate security data to the security broker. The security broker can use the security data obtained in connection with the redirect 610 to generate a security report that is communicated to and received 615 by the ecommerce provider. The ecommerce provider can consider information within the security report, such as risk assessment results provided by the security broker relating to the host device's general security to perform 620 any one of a variety of actions in connection with the transaction. Such actions 620 can be motivated, for instance, by the ecommerce provider's desire to take preventative actions against transactions with host devices having substandard security profiles or of questionable repute or identity. Similarly, actions 620 can be directed toward rewarding or incentivizing host devices determined to be authentic customers or possessing high degrees of security (and posing low risk to the ecommerce provider), among other examples. For instance, such actions can include the application or denial of discounts, streamlined transaction processes, the denial or allowance of the transaction, among other examples.

Turning to the flowchart 600*b* of FIG. 6B, in some examples, security data can be received 625, for instance, at a security broker from a host device or other system associated with the host device (such as a trusted security assessment system), the security data reporting attributes of the host device at any one of a variety of levels of abstraction and relating to the security of the host device. The security data can be sent in connection with an attempted ecommerce transaction with a particular ecommerce provider, such as in response to a redirect transmitted to the host device by the ecommerce provider. The security data can include identification of the specific and detailed attributes and configurations of the host device in some instances, and/or composite security information, such as security profile data and security scores generated from the raw host device attributes and representing any one of a variety of characteristics or macro attributes of the host device. In some instances, only a subset of the security data available for the host device may be received 625. For instance, a subset of the security data can be identified that is relevant to ecommerce transactions or particular types of security transactions, assessments by a particular security broker, particular security attributes of interest to an ecommerce provider's risk tolerance policies, or other subset relevant to the security broker's generation of a security report for the host device in connection with the ecommerce transaction.

A security broker can identify 630 a risk tolerance policy of the ecommerce provider involved in the particular transaction. In some examples, the risk tolerance policy can be received by the security broker from the ecommerce provider in connection with the particular transaction, for instance, to provide up-to-date or transaction-specific risk tolerance policies for consideration by the security broker. In other instances, the security broker can identify the ecommerce provider and other transaction information, such as transaction type, and identify pre-existing and/or pre-obtained risk tolerance policies corresponding to the identified ecommerce provider and/or transaction type. For instance, a corresponding risk tolerance policy for the attempted transaction involving the particular host device can be identified from a database of risk tolerance policies for potentially multiple different ecommerce providers and transaction types, among other examples. The identified risk tolerance policy can be assessed 635 based on the risk tolerance policy to determine whether and to what degree a host device's attributes (described in received security profile data) comply with the corresponding risk tolerance policy governing the transaction. A security report can be generated 640 from and report generalized results of the assessment (e.g., at 635) and the security report can be communicated 645 to the corresponding ecommerce provider for use by the ecommerce provider during the transaction.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. Systems and tools illustrated can similarly adopt alternate architectures, components, and modules to achieve similar results and functionality. For instance, in certain implementations, multitasking, parallel processing, and cloud-based solutions may be advantageous. Other systems and tools can also make use of principles of this disclosure. Additionally, diverse user interface layouts and functionality can be supported. Other variations are within the scope of the following claims.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal per se, a computer storage medium can be a source or destination of computer program instructions encoded in an artificially generated propagated signal. The computer storage medium can also be, or be included in, one or more separate physical components or media (e.g., multiple CDs, disks, or other storage devices), including a distributed software environment or cloud computing environment.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In general, subject matter of the present disclosure includes methods, software, computer executable instructions, and systems capable of performing such tasks as identifying an attempted transaction involving a first customer device, redirecting the first customer device to a security broker, and receiving from the security broker a security report for the first customer device. The security report can be based on security data transmitted from the first customer device to the security broker. An action can be performed in association with the attempted transaction based at least in part on the received security report. Other tasks can include receiving security data describing security conditions on a customer device in connection with a particular ecommerce transaction between the customer device and an ecommerce provider. A risk tolerance policy can be identified that corresponds to the ecommerce provider. A security report can be generated based on a comparison of the risk tolerance policy and the security data and the security report can be communicated to at least one computing device associated with the ecommerce provider.

In some instances, systems can be implemented that include at least one processor device, at least one memory element, and a security broker. The security broker can receive the security data, identify a risk tolerance policy of the ecommerce provider, generate a security report based on a comparison of the risk tolerance policy and the security data, and communicate the security report to at least one computing device associated with the ecommerce provider. Systems can additionally, or alternatively, include an ecommerce server associated with the ecommerce provider and adapted to identify attempted ecommerce transactions involving customer devices, redirect the customer devices to the security broker, receive security reports generated by the security broker, and perform actions in connection with the attempted ecommerce transactions based at least in part on the received security reports.

In some instance, the action can include allowing or disallowing the transaction and can be based at least in part on a type of the attempted transaction. For instance, the transaction can be an ecommerce transaction and the action can include applying a price discount in the attempted ecommerce transaction or applying a price premium in the attempted ecommerce transaction. The security broker can be a remote security broker. The security report can be generated based on a comparison of the risk tolerance policy and the security data. The security report can mask attributes of the security data and the security data can describe attributes of the first customer device relating to risk associated with the customer device.

In some instances, transaction data can be received in association with the received security data, the transaction data including an identifier of the particular transaction and an identifier of the ecommerce provider. The security requirements data can be obtained from a local memory element. The risk tolerance policy can be defined by the ecommerce provider. The security data can include a security score calculated for the customer device. The security data can be stored securely on the customer device and received over a secure communication channel. The security data describes configuration attributes of the customer device. The security data can include a pre-generated security score representing security conditions of the customer device. The security score can include a plurality of score components each corresponding to a particular security category. The security score can be generated by a neutral third party based on attributes of the customer device. Specific attributes of the customer device can be abstracted in the security data.

In some instances, security data can be received describing security conditions on the customer device in connection with a second ecommerce transaction between the customer device and a second ecommerce provider. A second risk tolerance policy can be identified corresponding to the second ecommerce provider. A second security report can be generated based on a comparison of the risk tolerance policy and the security data. The second security report can be communicated to at least one computing device associated with the second ecommerce provider, among other examples and combinations of the above.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A method comprising:
   identifying, at a server system hosting a particular service, an attempted transaction involving a first customer device and the particular service;
   determining whether the first customer device is associated with one of a set of trusted customer profiles;
   sending redirect data to the first customer device in response to determining that the first customer device is not associated with one of the set of trusted customer profiles, wherein the redirect data causes the first customer device to send security data to a security broker system remote from the server system and the first customer device, wherein the security data is to reference the attempted transaction with the particular service, the security data includes information describing security-related attributes of the first customer device, and the security data is sent privately between the first customer device and the security broker system to hide the security-related attributes from the server system;
   receiving at the server system, from the security broker, a security report for the first customer device corresponding to the attempted transaction, wherein the security report is based on a security policy associated with the particular service and the security-related attributes of the first customer device included in the security data transmitted from the first customer device to the security broker, and the security report indicates whether the first customer device is in compliance with the security policy of the particular service; and performing an action, at the server system, in association with the attempted transaction based at least in part on the received security report.

2. The method of claim 1, wherein the action is one of a set of available actions including allowing the transaction and disallowing the transaction.

3. The method of claim 1, wherein the action is based at least in part on a type of the attempted transaction.

4. The method of claim 3, wherein the action includes either allowance or disallowance of the transaction based on the security report.

5. The method of claim 1, wherein the security broker generates a security score from the security data and the security report identifies the security score.

6. The method of claim 1, further comprising communicating the security policy to the security broker associated with the particular service.

7. The method of claim 6, wherein the security report is generated based on a comparison of the security policy and the security data.

8. A method comprising:
receiving at a security broker system, over a secure communication channel of a computer network, security data from a customer device, the security data describing security conditions on the customer device in association with a particular ecommerce transaction between the customer device and a remote ecommerce provider, wherein the security data is sent in response to a redirect of the customer device to the security broker system by the ecommerce provider, and the security data is secured to be hidden from the ecommerce provider;
identifying a particular risk tolerance policy corresponding to the ecommerce provider, wherein the particular risk tolerance policy is one of a plurality of risk tolerance policies of a plurality of entities managed by the security broker system;
generating a security report based on a comparison of the particular risk tolerance policy and the security conditions described in the security data; and
communicating the security report to at least one computing device associated with the ecommerce provider, wherein the ecommerce provider is to use the security report in association with the particular ecommerce transaction.

9. The method of claim 8, further comprising receiving transaction data in association with the received security data, the transaction data including an identifier of the particular transaction and an identifier of the ecommerce provider.

10. The method of claim 8, wherein the security requirements data is obtained from a local memory element.

11. The method of claim 8, wherein the particular risk tolerance policy is defined by the ecommerce provider.

12. The method of claim 11, wherein the security data includes a security score calculated for the customer device.

13. The method of claim 8, further comprising:
receiving security data describing security conditions on the customer device in association with a second ecommerce transaction between the customer device and a second ecommerce provider;
identifying a second risk tolerance policy corresponding to the second ecommerce provider;

generating a second security report based on a comparison of the risk tolerance policy and the security data; and
communicating the second security report to at least one computing device associated with the second ecommerce provider.

14. At least one machine accessible storage medium having instructions stored thereon, the instructions when executed on a machine, cause the machine to:
identify, at a server system hosting a particular service, an attempted ecommerce transaction involving a first customer device;
determine whether the first customer device is associated with one of a set of trusted customer profiles;
send redirect data to the first customer device in response to determining that the first customer device is not associated with one of the set of trusted customer profiles, wherein the redirect data causes the first customer device to send security data to a security broker system remote from the server system and the first customer device, wherein the security data is to reference the attempted transaction with the particular service, the security data includes information describing security-related attributes of the first customer device, and the security data is sent privately between the first customer device and the security broker system to hide the security-related attributes from the server system;
receive at the server system, from the security broker, a security report for the first customer device corresponding to the attempted transaction, wherein the security report is to be based on a security policy associated with the particular service and the security-related attributes of the first customer device included in the security data, and the security report is to indicate whether the first customer device is in compliance with the security policy of the particular service; and
perform an action, at the server system, in association with the attempted ecommerce transaction based at least in part on the received security report.

15. The storage medium of claim 14, wherein the transaction comprises an ecommerce transaction.

16. The storage medium of claim 15, wherein the action is one of a set of available actions including applying a price discount in the attempted ecommerce transaction and applying a price premium in the attempted ecommerce transaction based on security of the transaction.

17. The storage medium of claim 14, wherein the security report masks attributes of the security data.

18. The storage medium of claim 14, wherein the security data describes attributes of the first customer device relating to risk associated with the first customer device.

19. At least one machine accessible storage medium having instructions stored thereon, the instructions when executed on a machine, cause the machine to:
receive, over a secure communication channel of a computer network at a security broker system, security data from a customer device, the security data to describe security conditions on the customer device in association with a particular ecommerce transaction between the customer device and a remote ecommerce provider, wherein the security data is sent in response to a redirect of the customer device to the security broker system by the ecommerce provider, and the security data is secured to be hidden from the ecommerce provider;
identify a particular risk tolerance policy corresponding to the ecommerce provider, wherein the particular risk tolerance policy is one of a plurality of risk tolerance policies of a plurality of entities managed by the security broker system;

generate a security report based on a comparison of the particular risk tolerance policy and the security conditions described in the security data; and communicate the security report to at least one computing device associated with the ecommerce provider, wherein the ecommerce provider is to use the security report in association with the particular ecommerce transaction.

20. The storage medium of claim 19, wherein the security data describes configuration attributes of the customer device.

21. The storage medium of claim 19, wherein the security data includes a pre-generated security score representing security conditions of the customer device.

22. The storage medium of claim 21, wherein the security score includes a plurality of score components each corresponding to a particular security category.

23. The storage medium of claim 21, wherein the security score is to be generated by a neutral third party based on attributes of the customer device.

24. The storage medium of claim 19, wherein specific attributes of the customer device are abstracted in the security data.

25. A system comprising:
   at least one processor device;
   at least one memory element; and
   a security broker, adapted when executed by the at least one processor device to:
      receive, over a secure communication channel of a computer network, security data from a customer device, the security data describing security conditions on the customer device in association with a particular ecommerce transaction between the customer device and a remote ecommerce provider, wherein the security data is sent in response to a redirect of the customer device to the security broker system by the ecommerce provider, and the security data is secured to be hidden from the ecommerce provider;
      identify a particular risk tolerance policy corresponding to the ecommerce provider, wherein the particular risk tolerance policy is one of a plurality of risk tolerance policies of a plurality of entities managed by the security broker system;
      generate a security report based on a comparison of the particular risk tolerance policy and the security conditions described in the security data; and
      communicate the security report to at least one computing device associated with the ecommerce provider, wherein the ecommerce provider is to use the security report in association with the particular ecommerce transaction.

26. The system of claim 25, further comprising an ecommerce server associated with the ecommerce provider and adapted when executed by the at least one processor device to:
   identify attempted ecommerce transactions involving customer devices and services hosted by the ecommerce provider;
   send data to customer devices to cause the customer devices to send security data to the security broker system remote from the server system and the customer devices, wherein the security data is to reference the attempted transaction with a corresponding one of the services and is to be hidden from the ecommerce server;
   receive one or more security reports generated by the security broker indicating security of the customer devices in association with the respective attempted transaction, wherein the security reports are to indicate whether the customer devices are in compliance with the particular risk tolerance policy; and
   perform actions in association with the attempted ecommerce transactions based at least in part on the received security reports.

* * * * *